Patented Nov. 5, 1935

2,019,510

UNITED STATES PATENT OFFICE 2,019,510

MODIFIED POLYHYDRIC ALCOHOL-POLY-BASIC ACID RESINS AND COMPOSITIONS CONTAINING THEM

Ben E. Sorenson, Wilmington, Del., assignor to E. I. du Pont de Nemours & Company, Wilmington, Del., a corporation of Delaware No Drawing. Application February 11, 1929, Serial No. 339,265

20 Claims. (Cl. 260—8)

This invention relates to the art of polyhydric alcohol-polybasic acid resins and, more particularly, to modified polyhydric alcohol-polybasic acid resins and compositions containing them.

I have discovered that polyhydric alcohol-polybasic acid resins, which are the reaction products of polyhydric alcohols and polybasic acids, with or without other ingredients, can be rendered more flexible and resilient than has heretofore been possible by esterifying hydroxy ethers with the other ingredients.

It is therefore an object of this invention to provide new and useful modified polyhydric alcohol-polybasic acid resins.

It is another object of this invention to provide a process of producing more flexible and resilient synthetic resins.

It is also an object of this invention to provide new and improved coating compositions containing my modified polyhydric alcohol-polybasic acid resins.

With the above and other objects in view, which will be apparent as the description proceeds, I have set forth my invention in the following specification and have included the following examples by way of illustration and not as a limitation.

Example 1

18.5 parts by weight of glycerol, 58.2 parts by weight of phthalic anhydride and 23.3 parts by weight of the monobutyl ether of ethylene glycol are heated in a suitable container equipped with a condenser, the temperature of the reaction mixture being gradually raised to 225° C. in 4 hours to avoid volatilizing the ether. The heating at 225° C. is continued for 1 hour with the reflux attached, by which time the esterification has proceeded to a point where very little ether will be volatilized off. The reflux is then removed and the heating at 225° C. is continued until the desired viscosity is obtained, which is preferably when the hot resin begins to string if it is allowed to flow from a suspended thermometer. The duration of the final heating depends on the consistency desired and the size of the batch, the reaction mixture losing water and gradually becoming more viscous as the reaction proceeds. 12 hours of the last mentioned heating gives a soluble resilient resin having an acid number of 40–50.

The reaction can also be carried out in a covered kettle without a reflux condenser by keeping the initial heating temperature down to approximately 180° C. until the esterification has raised the boiling point of the mixture to at least 225° C. For the composition of Example 1 this requires about 4 hours. The resinification is then finished as in Example 1.

Example 2

17.9 parts by weight of glycerol, 58.7 parts by weight of phthalic anhydride and 25.8 parts by weight of the monoethyl ether of diethylene glycol are heated together in a suitable covered container. The temperature is gradually raised to 225° C. in 3–4 hours with the container covered to prevent volatilization of the ether as much as possible. When the boiling point of the reaction mixture has been raised due to esterification so that the loss of ether is negligible, the lid is removed and the heating at 225° C. is continued until the desired viscosity is obtained. The time required to attain a consistency such that the hot resin begins to string when allowed to flow from a glass rod or from a suspended thermometer is about 5–6 hours at 225° C., depending on the shape of the reaction kettle and the quantity of resin being made. The resulting product is a soluble resilient resin having an acid number of from 10–20. If the reaction is interrupted before stringing occurs the product on cooling is softer and has a somewhat higher acid number.

Example 3

17.2 parts by weight of glycerol, 53.8 parts by weight of phthalic anhydride and 29.0 parts by weight of the monobutyl ether of diethylene glycol are heated as in Example 2, except that the reaction kettle need not be covered in heating to 225° C., due to the high boiling point of the ether. The resulting resin is soluble and flexible and has an acid number of from 20–30.

Example 4

17.4 parts by weight of glycerol, 55 parts by weight of phthalic anhydride and 27.6 parts by weight of diethylin are heated as in Example 2. The resin thus formed is soluble, slightly less flexible than the composition of Example 1, and has an acid number of 50–52.

Example 5

21.1 parts by weight of glycerol, 47.2 parts by weight of phthalic anhydride, 25.5 parts by weight of linseed oil acids and 6.2 parts by weight of the monoethyl ether of diethylene glycol are heated at 200° C. until the desired viscosity is obtained. The time required to attain a consistency such that the reaction mixture begins to string when allowed to flow from a suspended glass rod varies somewhat but 10–12 hours at 200° C. is usually sufficient. The resin formed is very flexible and soluble in aromatic hydrocarbons and in ester solvents and has an acid number of 30–40.

*Example 6*

The reaction is carried out as in Example 1 except that 2 to 3 parts by weight of castor oil is added to the reaction mixture. This gives a flexible resin as in Example 1 but the product is less sensitive to temperature change.

Although the above examples are limited to the monobutyl ether of ethylene glycol, the monoethyl ether of diethylene glycol, the monobutyl ether of diethylene glycol, and diethylin, other aliphatic hydroxy ethers, such as the monoethyl ether of ethylene glycol, the monomethyl ether of ethylene glycol, monoethylin, and beta-tetrahydrofuryl ethyl methyl carbinol, may be used.

As indicated in Examples 5 and 6, other modifying agents, such as linseed oil acids and castor oil, may enter into the esterification reaction.

The proportions of these modifying hydroxy ethers which I have found to be especially effective are 1 mol. of hydroxy ether to 1 mol. of glycerol and 2 mols. of phthalic anhydride, although other proportions can be used, depending on the desired consistency of the final resin. Increasing the hydroxy ether content gives softer resins, whereas decreasing this gives harder products. Where other modifying agents, such as drying oil acids, are present, 0.4 mol. of these modifying agents is preferably used in conjunction with 1 mol. of glycerol, 1.4 mols. of phthalic anhydride and 0.2 mol. of hydroxy ether.

The resins formed in accordance with my invention are soluble in acetone, ethyl acetate, the monoethyl ether of ethylene glycol, and in mixtures of alcohol and toluol.

These resins can be used alone in solution or in combination with cellulose esters, such as nitrocellulose, and other ingredients for film-forming purposes, such as wood and metal finishes, for impregnating paper and fabric, or as flexible binders for various materials, such as wood flour or cork.

Illustrations of typical compositions containing my new and improved resins are as follows:

*Example 7*

| | Pts. by wt. |
|---|---|
| Resin, prepared as in Example 1 | 9.1 |
| Nitrocellulose (¼ sec. viscosity) | 18.2 |
| Dibutyl phthalate | 9.1 |
| Castor oil | 3.6 |
| Butyl acetate | 24.2 |
| Ethyl acetate | 12.1 |
| Butyl alcohol | 12.1 |
| Ethyl alcohol | 6.0 |
| Toluol | 66.5 |
| | 160.9 |

The composition as prepared above has a viscosity of "A" (Gardner-Holdt standard) and contains 23–24% of non-volatile solids.

*Example 8*

| | Pts. by wt. |
|---|---|
| Resin, prepared as in Example 5 | 10.00 |
| Hi-flash naphtha | 15.00 |
| Cobalt linoleate | .03 |
| | 25.03 |

By the term "an esterifiable aliphatic hydrocarbon ether of a polyhydric alcohol", as used herein, I mean a polyhydric alcohol ether in which an aliphatic hydrocarbon radical has been substituted for a hydrogen of a hydroxyl group, and which still contains at least one alcoholic hydroxyl group in order that it may be reactive.

It will therefore be apparent that I have invented a new and useful group of modified polyhydric alcohol-polybasic acid resins which are more flexible and resilient than the polyhydric alcohol-polybasic acid resins heretofore obtainable, and that I have developed a new process of making polyhydric alcohol-polybasic acid resins.

As many apparently widely different embodiments of this invention may be made without departing from the spirit and scope thereof, it is to be understood that I do not limit myself to the specific embodiments thereof except as defined in the appended patent claims.

I claim:

1. The process of making a modified polyhydric alcohol-polybasic acid resin which comprises heating a polyhydric aliphatic alcohol, a resinifying polycarboxylic acid, and an esterifiable aliphatic hydrocarbon ether of a polyhydric alcohol.

2. The process of making a modified polyhydric alcohol-polybasic acid resin which comprises heating glycerol, phthalic anhydride, and an esterifiable aliphatic hydrocarbon ether of a polyhydric alcohol.

3. The process of claim 2, in which the hydrocarbon ether of a polyhydric alcohol is a monomethyl ether of ethylene glycol.

4. The process of claim 2, in which the hydrocarbon ether of a polyhydric alcohol is a monoethyl ether of ethylene glycol.

5. The process of claim 2, in which the hydrocarbon ether of a polyhydric alcohol is the monobutyl ether of ethylene glycol.

6. The process of making a modified polyhydric alcohol-polybasic acid resin which comprises gradually heating glycerol, phthalic anhydride and an esterifiable aliphatic hydrocarbon ether of a polyhydric alcohol in a kettle equipped with a reflux to bring the temperature up to 225° C. in 4 hours, and thereafter continuing the heating at 225° C. for 1 hour with the reflux attached, removing the reflux and heating until the hot resin begins to string if allowed to flow from a suspended thermometer.

7. The process of claim 6, in which the hydrocarbon ether of a polyhydric alcohol is a monomethyl ether of ethylene glycol.

8. The process of claim 6, in which the hydrocarbon ether of a polyhydric alcohol is a monoethyl ether of ethylene glycol.

9. The process of claim 6, in which the hydrocarbon ether of a polyhydric alcohol is the monobutyl ether of ethylene glycol.

10. The process of making a modified polyhydric alcohol-polybasic acid resin which comprises gradually heating 18.5 parts by weight of glycerol, 58.2 parts by weight of phthalic anhydride and 23.3 parts by weight of the monobutyl ether of ethylene glycol in a kettle equipped with a reflux to bring the temperature up to 225° C. in 4 hours, and thereafter continuing the heating at 225° C. for 1 hour with the reflux attached, removing the reflux and heating until the hot resin begins to string if allowed to flow from a suspended thermometer.

11. The process of making a modified polyhydric alcohol-polybasic acid resin which comprises gradually heating 18.5 parts by weight of glycerol, 58.2 parts by weight of phthalic anhydride and 23.3 parts by weight of the monobutyl ether of ethylene glycol in a kettle equipped with a reflux to bring the temperature up to 225° C. in 4 hours, and thereafter continuing the heating at 225° C. for 1 hour with the reflux attached, removing the reflux and heating at 225° C. for 12 hours.

12. A modified polyhydric alcohol-polybasic acid resin comprising the reaction product of a polyhydric aliphatic alcohol, a resinifying polycarboxylic acid, and an esterifiable aliphatic hydrocarbon ether of a polyhydric alcohol.

13. A modified polyhydric alcohol-polybasic acid resin comprising the reaction product of glycerol, phthalic anhydride, and an esterifiable aliphatic hydrocarbon ether of a polyhydric alcohol.

14. The resin of claim 13, in which the hydrocarbon ether of a polyhydric alcohol is a monomethyl ether of ethylene glycol.

15. The resin of claim 13, in which the hydrocarbon ether of a polyhydric alcohol is a monoethyl ether of ethylene glycol.

16. The resin of claim 13, in which the hydrocarbon ether of a polyhydric alcohol is the monobutyl ether of ethylene glycol.

17. A coating composition comprising the reaction product of glycerol, phthalic anhydride, and an esterifiable aliphatic hydrocarbon ether of a polyhydric alcohol.

18. The composition of claim 17, in which the hydrocarbon ether of a polyhydric alcohol is a monomethyl ether of ethylene glycol.

19. The composition of claim 17, in which the hydrocarbon ether of a polyhydric alcohol is a monoethyl ether of ethylene glycol.

20. The composition of claim 17, in which the hydrocarbon ether of a polyhydric alcohol is the monobutyl ether of ethylene glycol.

BEN E. SORENSON.